(12) United States Patent
De Jongste

(10) Patent No.: US 9,464,759 B2
(45) Date of Patent: Oct. 11, 2016

(54) METHOD AND FILLING INSTALLATION FOR FILLING A HYDROGEN GAS INTO A VESSEL

(71) Applicant: Teesing B.V., Rijswijk (NL)

(72) Inventor: Hendrikus De Jongste, Terborg (NL)

(73) Assignee: Teesing B.V., Rijswijk (NL)

( * ) Notice: Subject to any disclaimer, the term of this patent is extended or adjusted under 35 U.S.C. 154(b) by 0 days.

(21) Appl. No.: 14/746,484

(22) Filed: Jun. 22, 2015

(65) Prior Publication Data
US 2015/0285440 A1 Oct. 8, 2015

Related U.S. Application Data

(63) Continuation of application No. 13/377,093, filed as application No. PCT/NL2010/050351 on Jun. 9, 2010, now Pat. No. 9,074,729.

(30) Foreign Application Priority Data

Jun. 10, 2009 (NL) .................................. 1037030

(51) Int. Cl.
*F17C 5/06* (2006.01)

(52) U.S. Cl.
CPC ........... *F17C 5/06* (2013.01); *F17C 2205/013* (2013.01); *F17C 2205/0142* (2013.01);
(Continued)

(58) Field of Classification Search
CPC ............. F17C 5/06; F17C 2205/013; F17C 2205/0142; F17C 2221/012; F17C 2221/033; F17C 2223/0123; F17C 2223/035; F17C 2225/0123; F17C 2225/036; F17C 2227/0192; F17C 2250/032; F17C 2250/043; F17C 2250/0434; F17C 2250/0443; F17C 2250/0626; F17C 2250/0631; F17C 2260/023; F17C 2260/025; F17C 2265/025; F17C 2265/065; F17C 2270/0168; F17C 2270/0184

USPC .................. 141/2, 3, 9, 20, 94, 95, 100–107
See application file for complete search history.

(56) References Cited

U.S. PATENT DOCUMENTS

| 5,454,408 A | 10/1995 | Dibella et al. |
|---|---|---|
| 5,603,360 A | 2/1997 | Teel |

(Continued)

FOREIGN PATENT DOCUMENTS

| JP | 2005-273871 | 10/2005 |
|---|---|---|
| WO | 2008074075 | 6/2008 |

OTHER PUBLICATIONS

International Search Report of PCT/NL2010/050351 dated Aug. 5, 2010.

*Primary Examiner* — Timothy L Maust
(74) *Attorney, Agent, or Firm* — Rankin, Hill & Clark LLP

(57) ABSTRACT

Method and filling installation for filling a hydrogen gas into a vessel (1) having a first port (2) for passing the hydrogen gas and a second port (3) for passing a fluid, wherein the second port (3) is separate from the first port (2). In a first phase a hydraulic fluid is introduced into the vessel (1) through the second port (3) by applying pressure to the hydraulic fluid, such that the hydraulic fluid in the vessel (1) causes a hydrostatic pressure having a pre-determined value. In a second phase the hydrogen gas is introduced into the vessel (1) through the first port (2) by controlling a difference of pressure relative to a current pressure in the vessel (1) for controlling expansion of the hydrogen gas and thereby temperature inside the vessel (1), such that the vessel (1) is filled with the hydrogen gas. To that end the hydraulic fluid is removed from the vessel (1) through the second port (3).

15 Claims, 3 Drawing Sheets

(52) U.S. Cl.
CPC .. *F17C 2221/012* (2013.01); *F17C 2221/033* (2013.01); *F17C 2223/0123* (2013.01); *F17C 2223/035* (2013.01); *F17C 2225/0123* (2013.01); *F17C 2225/03* (2013.01); *F17C 2225/036* (2013.01); *F17C 2227/0192* (2013.01); *F17C 2250/032* (2013.01); *F17C 2250/043* (2013.01); *F17C 2250/0434* (2013.01); *F17C 2250/0443* (2013.01); *F17C 2250/0626* (2013.01); *F17C 2250/0631* (2013.01); *F17C 2260/023* (2013.01); *F17C 2260/025* (2013.01); *F17C 2265/025* (2013.01); *F17C 2265/065* (2013.01); *F17C 2270/0168* (2013.01); *F17C 2270/0184* (2013.01); *Y02E 60/321* (2013.01)

(56) References Cited

U.S. PATENT DOCUMENTS

| | | |
|---|---|---|
| 5,884,675 A | 3/1999 | Krasnov |
| 5,908,141 A | 6/1999 | Teel |
| 6,439,278 B1 | 8/2002 | Krasnov |
| 7,168,464 B2 | 1/2007 | Diggins |
| 7,284,575 B2 | 10/2007 | Gram et al. |
| 8,375,999 B2 | 2/2013 | Meisner |
| 9,074,729 B2 * | 7/2015 | De Jongste ............... F17C 5/06 |
| 2002/0129867 A1 | 9/2002 | Krasnov |
| 2012/0097292 A1 | 4/2012 | De Jongste |

* cited by examiner

METHOD AND FILLING INSTALLATION FOR FILLING A HYDROGEN GAS INTO A VESSEL

The present invention relates to a method for filling a hydrogen gas into a vessel, such as a fuel storage tank of a vehicle, having a first port for passing the gas and a second port for passing a fluid, wherein the second port is separated from the first port, in particular wherein the second port is spaciously or remotely separated from the first port.

United States Patent Specification U.S. Pat. No. B1-6,439,278 discloses a Compressed Natural Gas (CNG) refueling system comprising banks of coupled elongated cylinders, for transfer of CNG to a refueling depot. Each cylinder having, at one end thereof, separate ports for passing the CNG and a hydraulic fluid which does not readily mix with CNG. The hydraulic fluid port comprises a tube leading within the cylinder from the one end to a point adjacent to an opposite end of the cylinder. In use, the hydraulic fluid is introduced through the hydraulic fluid port into the cylinder by pressure, as to force CNG present in the cylinder to leave the cylinder through the gas port positioned above the level of the fluid.

Patent specifications U.S. Pat. No. 5,884,675 and DE-C1-198 43 669 and patent applications WO-A1-2009/035311 and DE-A1-10 2007 049 458 likewise disclose the use of a hydraulic fluid to force gas out of a transfer vessel, such as cylinder.

By filling a gas into a vessel at high pressure, e.g. in the range from 200 to 900 bar, the internal temperature of the vessel increases the more the pressure in the vessel increases during filling, due to compression of the gas and gas velocity friction heating. The heating-up of the gas in a vessel further results in a decrease of the pressure in the vessel, when, after filling, the vessel cools down to room temperature. The temperature increase during filling causes that the vessel can not be filled up to the maximum pressure and volume capacity.

Patent applications WO 2008/074075 and US 2003/039554 disclose compressed gas transfer systems, wherein compressed natural gas is transferred between pressure vessels of a compressed gas transfer system, using a hydraulic fluid.

Hydrogen gas has a particular property in that it heats up when it expands, such as when filling a vessel with hydrogen gas. This property is known as the reverse Joule-Thomson effect. Especially when filling vessels with hydrogen at high pressures, such as 700 bar, the generation of heat forms a limiting factor for the maximum filling rate or speed, because of the fact that vessels may only be used in a limited temperature range. For example, vessels made of a composite material loose their strength when its temperature exceeds a value of about 85° C.

In order to reduce such temperature increases, in practise the filling rate of the hydrogen gas is reduced, for instance by using a temperature controlled gas flow regulator. An undesirable effect of the reduced gas flow rate during filling the vessel is, of course, an increase of the time for filling the vessel. Other costly solutions include cooling the hydrogen gas before introducing the gas into the vessel. Strong pre-cooling of the gas may cause problems of freezing of connecting nipples. Furthermore, the temperature of the hydrogen gas in an on board fuel gas storage tank of a vehicle can not be controlled. The hydrogen gas needs to be sufficiently cold as to accomplish a desirable filling rate for a fuel gas storage tank, but when the fuel gas storage tank is only partially empty, the hydrogen gas may remain cold. When the hydrogen gas heats up after filling, the pressure in the fuel gas storage tank will increase, which may result in gas to be blown off from the on board storage tank through a safety valve, causing loss of valuable fuel gas.

The more the desirable filling pressure in the vessel is higher, the gas needs to be cooled to lower temperatures as to accomplish the filling of the vessel as complete as possible. In particular for filling vessels formed as a hydrogen fuel gas storage tank mounted in a vehicle, it is important that the fuel gas storage tank is filled with hydrogen gas as full as possible. This, because the more the fuel gas storage tank is better filled, the distance which can be covered by the vehicle having a fully filled fuel gas storage tank increases, the energy required for refueling as a whole is reduced and time is saved through the fact that the fuel gas storage tank needs to be filled less often. This, of course, to the satisfaction of the driver of the vehicle.

Accordingly, the object of the invention is to provide a method for filling a hydrogen gas into a vessel, providing an improved filling rate, reduced losses of energy during filling and which does not require the use of cooling systems for pre-cooling the hydrogen gas to be filled into the vessel, all this such that the vessel can be filled up to the maximum filling pressure and volume capacity in an optimal way.

In accordance with the invention this is accomplished, with a vessel as indicated in the introduction, by introducing a hydraulic fluid through the second port into the vessel by applying pressure such that the hydraulic fluid in the vessel causes a hydrostatic pressure having a pre-determined value, and by controlling a difference of pressure relative to a current pressure in the vessel for controlling expansion of the hydrogen gas and thereby temperature inside the vessel, wherein the hydrogen gas is introduced through the first port into the vessel as to fill the vessel with the hydrogen gas at a predetermined pressure and the hydraulic fluid is removed out of the vessel through the second port.

That means, firstly, the vessel to be filled with hydrogen gas is filled with a hydraulic fluid, whereupon the hydrogen gas is introduced through the first port into the vessel while the hydraulic fluid can flow out of the vessel through the second port.

In the method according to the invention, when filling the vessel with hydrogen gas, the difference of pressure by which the hydrogen gas flows and expands into the vessel is controlled and therewith the temperature inside the vessel and the temperature of the vessel itself, such that the vessel can be filled up to its maximum pressure and volume capacity at a desirable filling rate and not exceeding temperatures in the vessel above the maximum allowable vessel temperature.

A desirable filling rate will be appreciated as to be a filling rate for filling vessels which is obtained by using sophisticated filling means according to the prior art. For instance, a filling rate by which nowadays in practise fuel storage tanks of cars are filled with Liquefied Petroleum Gas, LPG. In practice, it is desirable that filling 5 kilograms of hydrogen gas into a fuel gas storage tank mounted in a vehicle will not take more than 5 minutes of time. With the method according to the invention, such a filling rate can be obtained for hydrogen vehicle fuel storage tanks storing hydrogen at a pressure up to 700 bar or even higher.

Preferably, according to the present invention, the hydraulic fluid is water. In practise, the combination of hydrogen as the gas and water as the hydraulic fluid has advantage in that in many fuel cells the hydrogen gas needs to be moistened, where-as the moistening can be accomplished partly by the water being used as the hydraulic fluid. In this it is important that the water intermixes with the hydrogen gas to some extent, wherein a portion of the hydrogen gas will dissolve in the water and a portion of the water will evaporate, such that the thermal behaviour of the method as a whole will improve. For the use in fuel cells the water has to be sufficiently pure, because contaminants can adversely affect the operation of the fuel cells.

In an embodiment of the method according to the invention the hydrostatic pressure of the fluid in the vessel is selected to be substantially equal to a pre-determined pressure of the hydrogen gas in the vessel, the so-called filling pressure. Because of this, the difference of pressure by which the gas flows into the vessel can simply be limited by a pre-determined value.

In a preferred embodiment of the invention, the filling pressure of the hydrogen gas is essentially 700 bar.

In a further embodiment of the method according to the invention the difference of pressure is accomplished by decreasing the pressure in the vessel by removing the hydraulic fluid out of the vessel through the second port in such way that the space becoming available in the vessel by removing the hydraulic fluid is filled with the hydrogen gas at the current pressure. The pressure of the hydrogen gas at the first port does not need to be higher than the hydrostatic pressure practised by the hydraulic fluid in the vessel.

In the instance that the hydrostatic pressure of the hydraulic fluid in the vessel is substantially equal to the desirable filling pressure of the hydrogen gas, the pressure of the hydrogen gas supplied at the first port of the vessel does not need to be higher than the desirable filling pressure.

In another further embodiment of the method according to the invention the difference of pressure is accomplished by increasing the pressure of the hydrogen gas to be introduced into the vessel such that the hydraulic fluid is removed out of the vessel by replacement caused by the hydrogen gas flowing into the vessel. It is appreciated that in this method according to the invention the pressure of the gas at the first port of the vessel needs to be higher than the hydrostatic pressure of the hydraulic fluid in the vessel.

Persons skilled in the art will understand that in the latter embodiment control means are needed for controlling the pressure of the hydrogen gas at the first port of the vessel, while in the last but one of the latter embodiment of the method according to the invention, control means are needed for controlling the outflow of the fluid out of the vessel through the second port. Control means of this kind are well-known for a person skilled in the art, and therefore do not need further explanation.

In order to increase the pressure of the hydrogen gas at the first port the hydrogen gas is compressed in a supply line connected to the gas port of the vessel in an yet further embodiment of the method.

It has been found that the method according to the invention is particularly suitable for introducing the hydrogen gas from a gas supply vessel or from a buffer vessel into the vessel to be filled, wherein the difference of pressure can be accomplished by introducing a hydraulic fluid into the gas supply vessel supplying the hydrogen gas. In advantage thereto the hydraulic fluid as removed from the vessel is introduced into the gas supply vessel supplying the hydrogen gas. It is appreciated that in this way it is realized a filling system which is efficient as to the use of the hydraulic fluid.

The hydraulic fluid has to be in liquid form in the range of operating temperatures at which the vessel will be filled with the hydrogen gas. For use outside, the fluid shall not become frozen, and, preferably have a low viscosity and a low vapour pressure in the range of the operating temperatures. Besides water, a suitable hydraulic fluid may be an oil having a low vapour pressure. Obviously, the fluid shall be selected such that the fluid neither negatively affects the vessel nor a filling installation connected with the vessel nor an installation in which the gas is used as a fuel, such as for instance fuel cells in a vehicle.

In a yet further embodiment of the method according to the invention an amount of the hydrogen gas is introduced into the vessel while the hydraulic fluid is being introduced into the vessel, for instance for a combination of hydrogen gas and water as described above, wherein the amount of the hydrogen gas to be introduced per unit of time is less than a pre-determined value.

In a further embodiment of the invention the time needed for filling the vessel with a hydraulic fluid can be reduced by introducing the hydraulic fluid into the vessel through both ports.

As already been described above, the method according to the invention is particularly suitable for introducing a hydrogen gas from a gas supply vessel into a vessel to be filled, for instance, such as in a filling station for filling a hydrogen fuel gas storage tank mounted in a vehicle.

A person skilled in the art will appreciate that the gas supply vessel can also consist of a number of mutually coupled supply vessels, such as deemed to be comprised by the term gas supply vessel used in the description and the claims.

The invention further relates to a filling installation comprising a gas supply vessel containing hydrogen gas, a fluid supply vessel filled with a hydraulic fluid and means coupled with the gas supply vessel and the fluid supply vessel, wherein the means are arranged for filling a gas into a vessel in accordance with the method according to the invention as described above.

In a further embodiment of the filling installation according to the invention, the gas supply vessel and the fluid supply vessel, as such also including a plurality of fluid supply vessels, can be constituted by one or more mutually couplable vessels.

The invention also relates to a filling unit for use with a vessel, such as a fuel storage tank of a vehicle, the filling unit having means for coupling the filling unit with an inlet of the vessel and a first port for passing hydrogen gas and a second port for passing a fluid, wherein the second port is separate from the first port in the filling unit, and in particular wherein the second port is spaciously or remotely separated from the first port in the filling unit.

The invention will be explained in more detail on the basis of the accompanying drawing in which.

In the drawing same parts or parts having a similar function are indicated by same reference signs.

In the present description and the claims, the term vessel comprises all types of storage containers designed to hold hydrogen gases or fluids in liquid form at a pressure which may differ from the ambient pressure.

Figure 1:
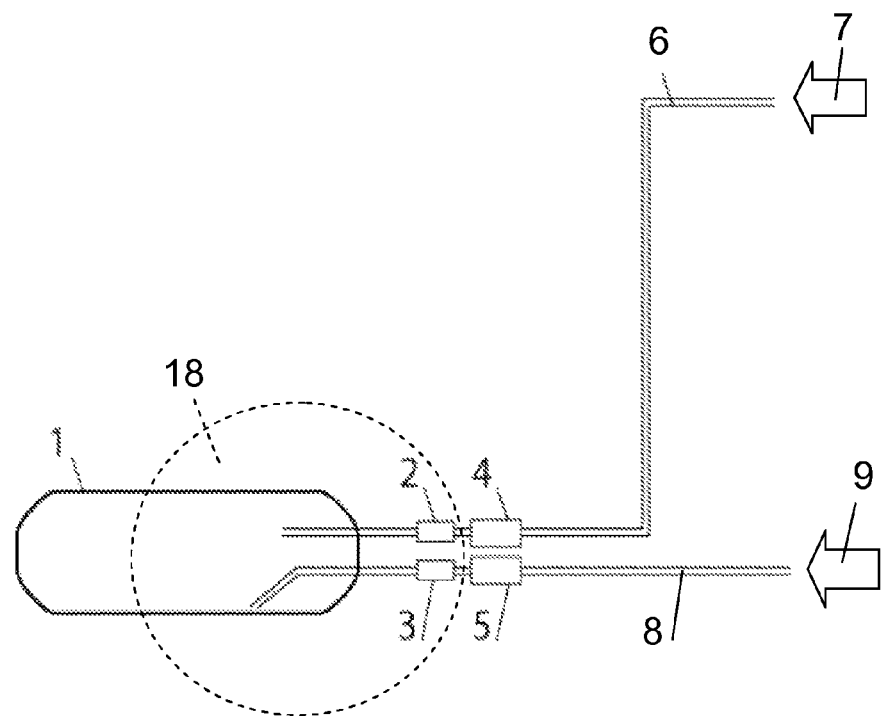
FIG. 1 shows schematically a vessel having a first port and a second port for performing the method according to the invention.

FIG. 1 shows schematically a vessel 1, for instance such as a hydrogen fuel gas storage tank mounted in a vehicle or a hydrogen gas cylinder or the like, having a first port 2 for passing a gas and a second port 3 for passing a fluid, wherein the second port 3 is separated from the first port 2. In the embodiment shown, the second port 3 is spaciously or remotely separated from the first port 2.

As schematically shown in FIG. 1 the second port 3 terminates in the vessel 1, preferably, below the end of the first port 2 situated in the vessel 1, when the vessel 1 is put in a position for operation. It is not necessary that both ports 2, 3 are situated at the same side of the vessel 1 or in their vicinity. For instance, both ports 2, 3 can be situated at opposite sides or ends of the vessel or be provided as an integrated unit, schematically indicated by a dotted circle 18, as to be disposed in a single mouth or inlet of a vessel, such that, for instance, current vessels having a single mouth can be filled with a gas in accordance with the method of the invention.

The unit 18 may be provided with suitable means for coupling or mounting same to the mouth or inlet of the vessel, such as known to the skilled person.

The first port 2 is connected to a line 6 by means of a gas coupling 4 as to supply hydrogen gas with which the vessel 1 has to be filled. The hydrogen gas may be supplied from a hydrogen gas supply, schematically indicated by an arrow 7.

The second port 3 is connected to a line 8 by means of a fluid coupling 5 for introducing a hydraulic fluid into the vessel 1. The hydraulic fluid may be supplied from a fluid source, schematically indicated by an arrow 9.

Even though the vessel 1 is shown as a single vessel, persons skilled in the art will appreciate that the vessel to be filled may consist of several mutually coupled vessels of a different shape, such as in the case of a fuel gas storage tank mounted in a vehicle, which for reasons of design are often composed of several mutually coupled sub-tanks for the storage of a fuel gas.

Although not explicitly shown, the first and the second ports 2, 3 are provided with respective means for opening and closing the port individually. These means may also consist of individual valves or, for instance, form part of the gas coupling 4 or the fluid coupling 5. Further explanation will not be necessary for persons skilled in the art.

In illustrating the invention, it is assumed that initially the vessel 1 is empty and has to be filled with a hydrogen gas. In a first step, also called the pressure-building phase, a hydraulic fluid from the fluid source 9 is introduced through the second port into the vessel 1 by applying pressure to the hydraulic fluid, wherein the first port 2 is closed. Preferably, the vessel 1 is filled with the hydraulic fluid such that the hydraulic fluid causes a hydrostatic pressure which is equal or substantially equal to a pre-determined or desirable pressure of the hydrogen gas in the vessel, in practise also called the desirable filling pressure.

Natural gas and other industrial gases are generally stored in a vessel at a filling pressure of about 200 bar. In practise a filling pressure in the order of 350 bar is used for hydrogen gas in vehicles. On the other hand, more sophisticated vehicles frequently make use of filling pressures having a value up to 700 bar or higher. The method according to the invention is not limited by the like filling pressures.

After the vessel 1 has been filled with fluid, in a second phase hydrogen gas from the gas supply 9 is supplied under pressure through the line 6 to the first port 2 for filling the hydrogen gas into the vessel 1, wherein the fluid in the vessel 1 is exchanged against hydrogen gas. This is called the fluid-gas-exchange phase.

The necessary difference of the pressure of the hydrogen gas that is introduced through the first port 2 and the hydrostatic pressure of the fluid in the vessel 1, to control the rate of expansion of the hydrogen gas into the vessel and thereby the temperature or heat generation inside the vessel 1, can be accomplished in several different ways in accordance with the method according to the invention.

In an embodiment of the method according to the invention, the difference of the pressure is accomplished by decreasing the pressure in the vessel 1 by a controlled outflow of the hydraulic fluid out of the vessel 1 through the second port 3, such that the space becoming free in the vessel 1 is filled with hydrogen gas. The fluid can flow out of the vessel 1 through the second port 3 and the line 8 connected to it.

It is appreciated that the difference of pressure can be controlled by controlling the amount of fluid leaving the vessel 1 per unit of time. Therewith the difference of pressure can be maintained under a pre-determined value for regulating the temperature of the hydrogen gas expanding in the vessel 1 such as to prevent overheating of the vessel 1 and as to fill the vessel 1 up to about the maximum pressure and volume capacity. After all, a too high temperature has the disadvantage that the vessel will not be completely filled as explained in the introduction.

The difference of pressure of the hydrogen gas supplied through the first port 2 and the hydrostatic pressure of the hydraulic fluid in the vessel 1 can also be accomplished in a further embodiment of the method by increasing the pressure of the hydrogen gas to be introduced into the vessel 1 through the port 2 to such extent that the hydraulic fluid in the vessel 1 is removed by displacement caused by the hydrogen gas flowing into the vessel 1.

As to accomplish the desirable difference of pressure the hydrogen gas source 7 can be provided with means for compressing the hydrogen gas at a sufficiently high pressure in the line 6 to the port 2.

Figure 2:
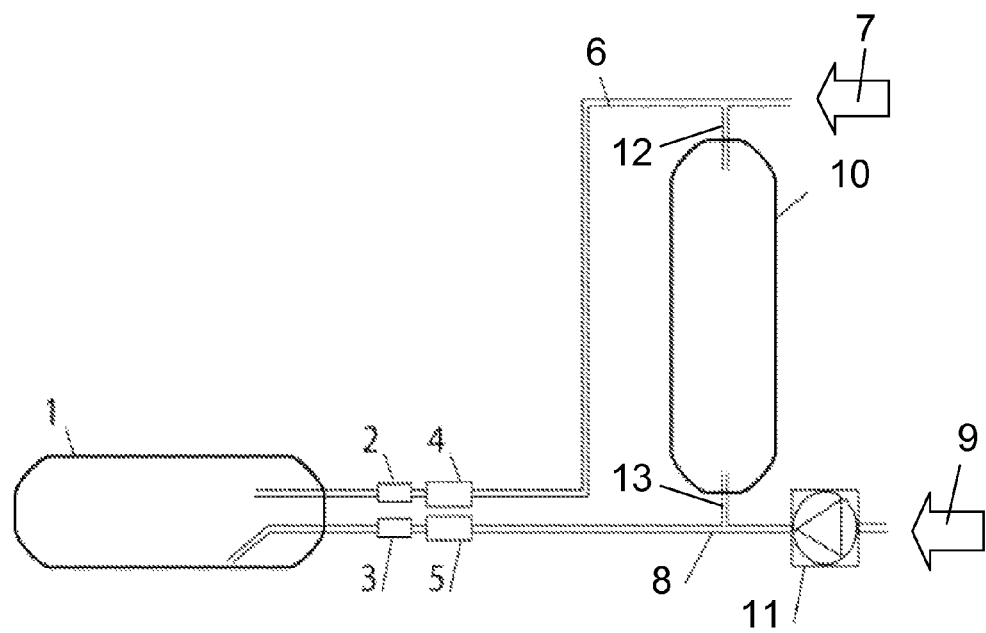
FIG. 2 shows schematically a first embodiment of a filling installation for filling the vessel of FIG. 1 in accordance with the method according to the invention.

FIG. 2 shows schematically a filling installation for filling hydrogen gas into the vessel 1 of FIG. 1 in accordance with a first embodiment of the invention.

In this embodiment it is used a hydrogen gas supply vessel 10 having a first end which is connected by means of a connection 12 to the line 6 to the first port 2 of the vessel 1, and a second end opposite the first end, wherein the second end is connected by a connection 13 to the line 8 to the second port 3 of the vessel 1. Although not explicitly shown the connections 12 and 13 include means for opening and closing a respective connection 12, 13 which as such are known by persons skilled in the art.

For filling hydrogen gas into the vessel 1 in accordance with a method according to the invention, in a first phase, fluid from a fluid source 9 is introduced into the vessel 1 through the second port 3 by means of a pump 11 up to a maximum of the desirable filling pressure of the hydrogen gas in the vessel 1, as explained above on the basis of FIG. 1. The connection 13 to the hydrogen gas supply vessel 10 is kept closed.

Subsequently hydrogen gas from the hydrogen gas supply vessel 10 is introduced into the vessel 1 through the line 6 and the first port 2, wherein by opening the connection 13 fluid can flow out of the vessel 1 through line 6 into the hydrogen gas supply vessel 10.

Instead of or in addition to the gas supply the hydrogen gas can also be introduced from the hydrogen gas supply vessel 10 into the vessel 1. To this end the connection 12 of the hydrogen gas supply vessel 10 to the line 6 is opened after the vessel 1 has been filled with fluid such that hydrogen gas can flow from the hydrogen gas supply vessel 10 through the first port 2 into the vessel 1, wherein the fluid contained in vessel 1 flows through line 8 and the opened connection 13 into the hydrogen gas supply vessel 10. In this case the pressure of hydrogen gas in the hydrogen gas supply vessel 10 can be equal to the hydrostatic pressure of the fluid in the vessel 1 to be filled.

It is noted that the hydrogen gas in the hydrogen gas supply vessel 10 may have a pressure higher than the hydrostatic pressure of the fluid in the vessel 1 as to accomplish a desirable difference of pressure for filling the vessel 1 with hydrogen gas through replacement of the fluid contained in the vessel 1.

In a modification of this embodiment the vessel 1 and the hydrogen gas supply vessel 10 are positioned in an arrangement wherein the level of the hydraulic fluid in the hydrogen gas supply vessel 10 is below the level of the second port 3 of the vessel 1 as to cause the hydraulic fluid in the vessel 1 being siphoned into the hydrogen gas supply vessel 10 such that the filling rate of the hydrogen gas is determined by the difference of height of the level of the second port 2 of the vessel 1 and the level of the hydraulic fluid in the hydrogen gas supply vessel 10.

Figure 3:
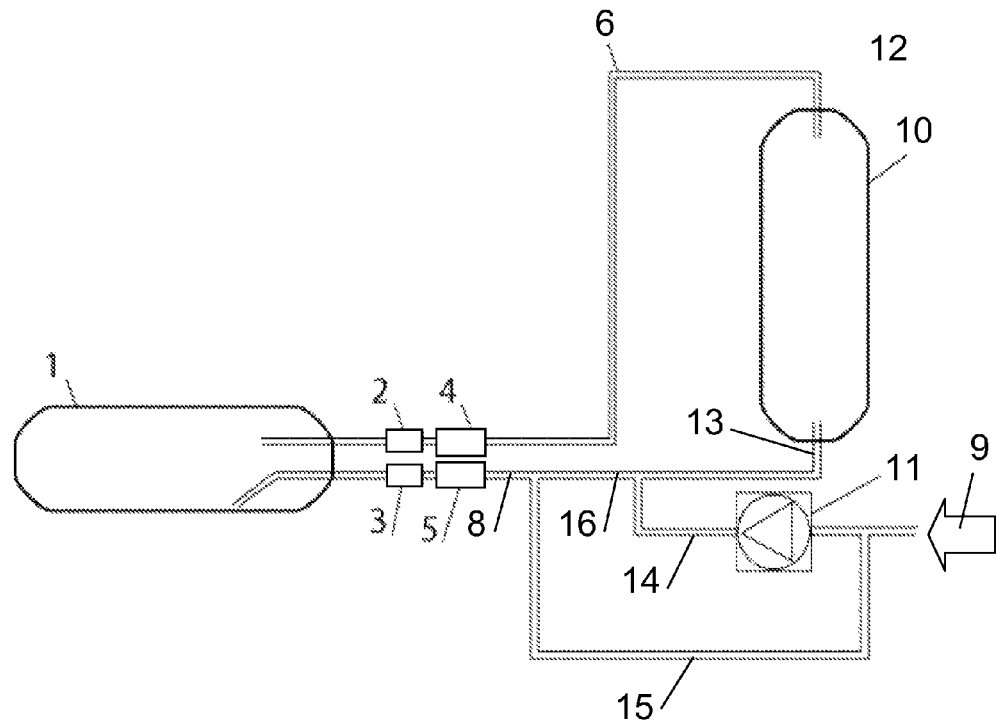
FIG. 3 shows schematically a second embodiment of a filling installation for filling the vessel of FIG. 1 in accordance with the method according to the invention.

FIG. 3 shows schematically a filling installation in accordance with a second embodiment of the invention, wherein in addition to the embodiment shown in FIG. 2 the pump 11 can pump fluid through a line 14 and 16 into the line 8, and wherein during filling hydrogen gas into the vessel 1 fluid flowing out of vessel 1 can be pumped by the pump 11 through the line 8, the line 15, the line 14 and the connection 13 into the hydrogen gas supply vessel 10. It will be appreciated that the lines 14, 15 and 16 are provided with means for opening and closing the respective lines, wherein these means are not explicitly shown in FIG. 3 but in itself well known to a person skilled in the art.

By pumping the fluid flowing out of the vessel 1 by means of the pump 11 into the hydrogen gas supply vessel 10, the pressure of the hydrogen gas contained in the hydrogen gas supply vessel 10 is increased. For this embodiment it may be decided not to use an individual gas source 7, such that this filling installation is particularly suitable as a filling station, wherein the hydrogen gas for filling the vessel 1 is provided in vessels which as such function like the individual gas source 7.

Although the filling installation of FIG. 3 can be operated with a single pump 11, it will be clear to a person skilled in the art that several pumps may be used for pumping fluid into vessel 1 and for pumping fluid into the hydrogen gas supply vessel 10.

Figure 4:
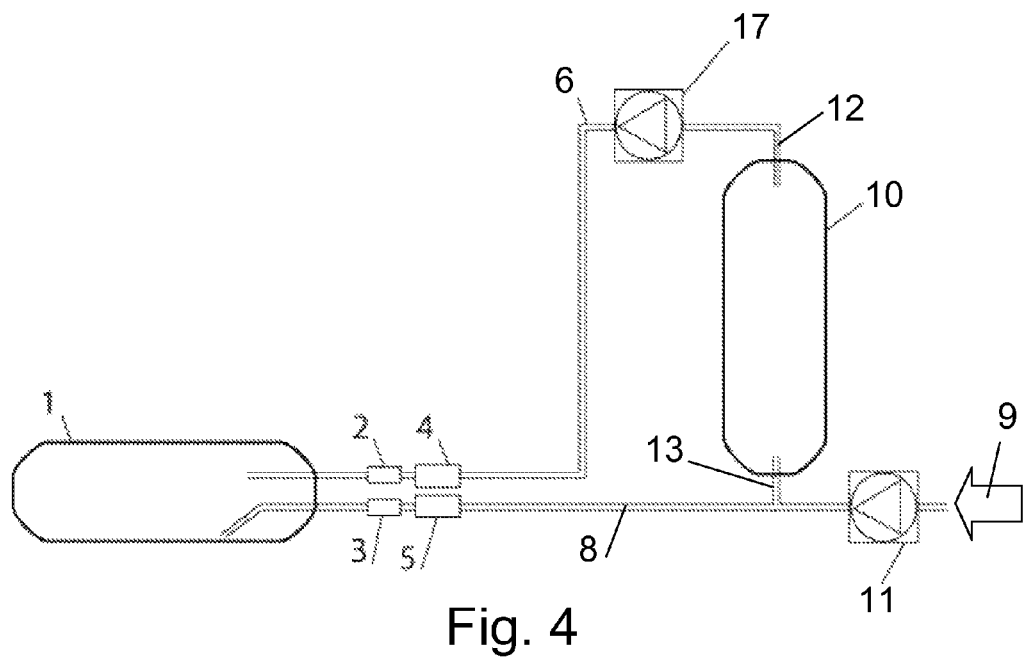
FIG. 4 shows schematically a third embodiment of a filling installation for filling the vessel of FIG. 1 in accordance with the method according to the invention.

In a third embodiment of a filling installation in accordance with the invention as schematically shown in FIG. 4 a booster 17 is installed between the connection 12 of the hydrogen gas supply vessel 10 and the line 6 such that in the second phase of the filling operation a desirable difference of pressure can be accomplished between the gas at the first port 2 of the vessel 1 as provided from the hydrogen gas supply vessel 10 and the pressure of the fluid in the vessel 1.

In this embodiment it is also possible to pump fluid from the fluid source 8 into the hydrogen gas supply vessel 10 by means of the pump 11 as to increase the pressure in the hydrogen gas supply vessel 10 for filling the vessel 1 with hydrogen gas. It is an advantage of this that it can be used a gas supply vessel wherein the initial pressure of the gas is relatively lower than the desirable filling pressure to be obtained in the vessel 1. By using several coupled supply vessels, one or more of the vessels filled with fluid, so-called fluid supply vessels, can function like the fluid source 9.

The embodiment of FIG. 4 is also suitable for filling installations being operated with a relatively small hydrogen gas supply vessel 10, wherein at the beginning of the second phase of the filling operation, when fluid in the vessel 1 is exchanged against hydrogen gas, initially the pressure of the hydrogen gas in the hydrogen gas supply vessel 10 may drop fast and subsequently the drop of pressure can be set off by pumping fluid into the hydrogen gas supply vessel 10 such that the pressure in the hydrogen gas supply vessel 10 can be increased when vessel 1 is being filled. If necessary, it may be decided not to use the booster 17 between the connection 12 of the hydrogen gas supply vessel 10 and the line 6 to the first port 2 of the vessel 1.

Figure 5:
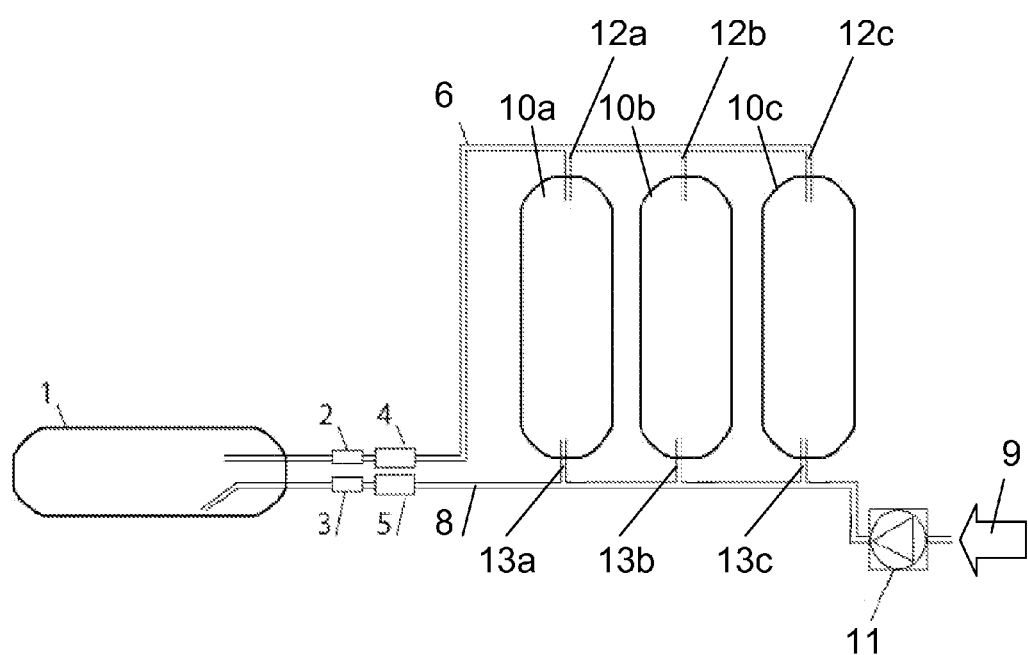
FIG. 5 shows schematically a fourth embodiment of a filling installation for filling the vessel of FIG. 1 in accordance with the method according to the invention.

In the fourth embodiment of a filling installation in accordance with the invention, as shown in FIG. 5, it is used several hydrogen gas supply vessels 10a, 10b, 10c, each having a respective connection 12a, 12b, 12c for connection with line 6 to the first port 2 of the vessel 1, and a respective connection 13a, 13b, 13c for connection with line 8 to the second port 3 of the vessel 1. The connections 13a, 13b, 13c are arranged such that individual connections can be accomplished between the pump 17 and a hydrogen gas supply vessel 10a, 10b, 10c, and between vessel 1 and a hydrogen gas supply vessel 10a, 10b, 10c, such that for instance fluid from the fluid source 9 is pumped into one of the hydrogen gas supply vessels 10a, 10b, 10c, and at the same time fluid can flow from the vessel 1 into a different hydrogen gas supply vessel 10a, 10b, 10c. Again, it is applicable that, although not shown, the respective connections 12a, 12b, 12c, 13a, 13b, 13c include well known means for opening and closing a connection.

The use of several mutually coupled hydrogen gas supply vessels 10a, 10b, 10c allow, for instance, that fluid from the fluid source 9 is pumped into one of the hydrogen gas supply vessels 10a, 10b, 10c as to substantially fill the vessel. The pressure required for filling hydrogen gas into vessel 1 can be accomplished by providing fluid from the vessel filled with fluid into a hydrogen gas supply vessel 10a, 10b, 10c from which the hydrogen gas flows into the vessel 1 as to accomplish a desirable difference of pressure for filling hydrogen gas into the vessel 1. It is appreciated that when a plurality of vessels is used a scenario can be designed for pumping fluid between the several vessels and for collecting fluid flowing out of vessel 1 in one or more of the vessels when the vessel 1 is being filled with hydrogen gas.

In the embodiment of the filling installation in accordance with the invention as shown in FIG. 5 the time needed for introducing fluid into the vessel 1 can be reduced up by introducing fluid through the first port 2 as well as through the second port 3 into the vessel 1. Apparently, the first port 2 and the coupling 4 shall be arranged for such purpose.

In addition to the embodiments as shown and described above a heat exchanger can be constructed in the vessel 1 to be filled with hydrogen gas, such that the heat generated by the hydrogen gas during filling is captured and transferred to an environment external to the vessel 1. Apparently it is also possible to have a heat exchanger exterior to the vessel 1, such that the external heat exchanger transfers the captured heat to the environment external to the vessel 1 and/or the hydraulic fluid applied for filling the hydrogen gas into the vessel 1.

In practice, with the method according to the invention, a marginal pressure difference is sufficient for achieving a desired filling rate and/or filling time of vessels, such as hydrogen fuel storage tanks of commercial motor vehicles.

It is appreciated that the method according to the invention is also suitable for filling vessels which are not completely empty, but contain a remainder of hydrogen gas. During the time that the hydraulic fluid is introduced into the vessel to be filled with hydrogen gas care has to be taken as to prevent the remainder of hydrogen gas not being compressed too rapidly, such that unwanted generation of heat would occur. Obviously, the remainder of hydrogen gas present in the vessel to be filled can be removed from the vessel, and, for instance, being collected in a supply vessel, after which the empty vessel can be filled with fluid as described above. By measuring the amount of hydrogen gas removed from the vessel, the amount as measured can be taken into account for determining the amount of hydrogen gas effectively delivered in the vessel 1.

Many modifications and additions for the filling installations and the vessel for filling hydrogen gas into the vessel in accordance with the invention as described and shown may be conceived by a person skilled in the art. All these modifications and additions are deemed to be included by the accompanying claims.

The invention claimed is:

1. A filling station for filling a vessel with hydrogen gas at a predetermined pressure, said vessel having a first port for passing said hydrogen gas and a second port for passing a fluid, said second port being separate from said first port, said filling station comprising:
   a hydrogen gas supply for supplying hydrogen gas under pressure;
   a fluid supply for supplying a hydraulic fluid under pressure;
   a fluid coupling for coupling with said second port of said vessel for introducing hydraulic fluid under pressure from said fluid supply into said vessel such that said hydraulic fluid in said vessel causes a hydrostatic pressure having a value substantially equal to said predetermined pressure of said hydrogen gas in said vessel, and for removing said hydraulic fluid from said vessel, and
   a gas coupling for coupling with said first port of said vessel for introducing hydrogen gas from said hydrogen gas supply into said vessel to fill said vessel with said hydrogen gas at said predetermined pressure by controlling a difference of pressure relative to a current pressure in said vessel for controlling expansion of said hydrogen gas in said vessel and thereby temperature inside said vessel.

2. The filling station according to claim 1, wherein said predetermined pressure is essentially 700 bar.

3. The filling station according to claim 1, further comprising a pump arranged in a line between said fluid coupling and said fluid supply for introducing said hydraulic fluid under pressure into said vessel.

4. The filling station according to claim 1, wherein for accomplishing said difference of pressure hydraulic fluid is removed from said vessel through said second port and fluid coupling coupled to said second port, thereby decreasing pressure in said vessel, and hydrogen gas is introduced into said vessel from said hydrogen gas supply at said predetermined pressure through said first port and gas coupling coupled to said first port, such that space becoming available in said vessel by removing said hydraulic fluid is filled with said hydrogen gas at said predetermined pressure.

5. The filling station according to claim 1, wherein said hydrogen gas supply comprises at least one hydrogen gas supply vessel containing hydrogen gas at said predetermined pressure, said at least one hydrogen supply vessel having a first connection connecting by a line to said gas coupling and a second connection connecting by a line to said fluid coupling, wherein for accomplishing said difference of pressure hydraulic fluid is removed from said vessel through said second port and said fluid coupling coupled to said second port and said removed hydraulic fluid is introduced into said at least one hydrogen supply vessel at said second connection, thereby decreasing pressure in said vessel, and hydrogen gas is introduced into said vessel from said hydrogen gas supply vessel at said predetermined pressure said through said first port and gas coupling coupled to said first port, such that space becoming available in said vessel by removing said hydraulic fluid is filled with said hydrogen gas at said predetermined pressure.

6. The filling station according to claim 5, further comprising a pump arranged in a line between said fluid coupling and said second connection of said at least one hydrogen gas supply vessel, wherein hydraulic fluid is removed from said vessel and said removed hydraulic fluid is introduced into said at least one hydrogen supply vessel by pumping operation of said pump.

7. The filling station according to claim 1, wherein said hydrogen gas supply comprises at least one hydrogen gas supply vessel containing hydrogen gas, said at least one hydrogen supply vessel having a first connection connected by a line to said gas coupling and a booster arranged in said line between said first connection of said hydrogen supply vessel and said gas coupling for accomplishing said difference of pressure by increasing a pressure of said hydrogen gas to be introduced into said vessel from said hydrogen gas supply vessel through said first port and gas coupling coupled to said first port such that hydraulic fluid is removed from said vessel through said second port and fluid coupling coupled to said second port by replacement caused by hydrogen gas flowing into said vessel.

8. The filling station according to claim 1, wherein said hydrogen gas supply comprises at least one hydrogen gas supply vessel containing hydrogen gas, said at least one hydrogen supply vessel having a first connection connected by a line to said gas coupling and a second connection connecting by a line to a fluid supply for accomplishing said difference of pressure by introducing a hydraulic fluid into said hydrogen gas supply vessel thereby increasing a pressure of said hydrogen gas to be introduced into said vessel from said hydrogen gas supply vessel through said first port and gas coupling coupled to said first port such that hydraulic fluid is removed from said vessel through said second port and fluid coupling coupled to said second port by replacement caused by hydrogen gas flowing into said vessel.

9. The filling station according to claim 8, wherein said fluid coupling connects by a line to said second connection for introducing said hydraulic fluid removed from said vessel into said hydrogen supply vessel.

10. The filling station according to claim 1, wherein said hydrogen gas supply comprises a plurality of mutually coupled hydrogen gas supply vessels.

11. The filling station according to claim 1, wherein said fluid supply comprises a fluid supply vessel filled with a hydraulic fluid.

12. The filling station according to claim 1, wherein said fluid supply is arranged for supplying a hydraulic fluid having a low viscosity and a low vapour pressure and is in liquid form in a range of operation temperatures.

13. The filling station according to claim 12, wherein said hydraulic fluid is water.

14. The filling station according to claim 1, wherein said gas coupling and said fluid coupling are arranged in a filling unit for coupling with an inlet of said vessel comprising said first port and said second port.

15. The filling station according to claim 1, wherein said vessel is a hydrogen fuel gas storage tank mounted in a vehicle.

* * * * *